(12) United States Patent
Jitsukawa et al.

(10) Patent No.: US 10,605,268 B2
(45) Date of Patent: Mar. 31, 2020

(54) BLOWER

(71) Applicant: Valeo Japan Co., Ltd., Saitama (JP)

(72) Inventors: Hiroki Jitsukawa, Saitama (JP); Hideki Nagano, Saitama (JP); Naoto Hayashi, Saitama (JP)

(73) Assignee: Valeo Japan Co., Ltd., Saitama (JP)

( * ) Notice: Subject to any disclaimer, the term of this patent is extended or adjusted under 35 U.S.C. 154(b) by 26 days.

(21) Appl. No.: 16/092,525

(22) PCT Filed: Apr. 7, 2017

(86) PCT No.: PCT/JP2017/014466
§ 371 (c)(1),
(2) Date: Oct. 10, 2018

(87) PCT Pub. No.: WO2017/179499
PCT Pub. Date: Oct. 19, 2017

(65) Prior Publication Data
US 2019/0170160 A1  Jun. 6, 2019

(30) Foreign Application Priority Data
Apr. 12, 2016  (JP) .................................. 2016-079467

(51) Int. Cl.
*F04D 29/62* (2006.01)
*F04D 29/02* (2006.01)
(Continued)

(52) U.S. Cl.
CPC ........ *F04D 29/626* (2013.01); *B29C 45/2616* (2013.01); *B29C 45/2708* (2013.01);
(Continued)

(58) Field of Classification Search
CPC ...... F04D 29/626; F04D 17/16; F04D 29/023; F04D 29/263; B29C 45/26;
(Continued)

(56) References Cited

U.S. PATENT DOCUMENTS 9,514,293 B1  12/2016 Moritz et al.
10,436,222 B2 * 10/2019 Yamamoto ............ F04D 29/023

FOREIGN PATENT DOCUMENTS

CN    101350710 A    1/2009
CN    103841557 A    6/2014
(Continued)

OTHER PUBLICATIONS

The International Search Report issued in corresponding International Application No. PCT/JP2017/014466, dated Jul. 11, 2017 (4 pages).

(Continued)

*Primary Examiner* — Richard A Edgar
(74) *Attorney, Agent, or Firm* — Osha Liang LLP

(57) ABSTRACT

A blower which uses a rotation prevention member in which a rotating shaft with circular cross section is press-fitted is disclosed. The blower includes a scroll housing, a resin-made stator which is press-fitted on a rotating shaft with circular cross section, and a centrifugal fan which has a boss inserted on the stator, a cone extending from the boss, and blades extending from the cone, in which the stator and boss are a tubular members. A stator engagement part is formed in a stator outer circumferential face. The stator has a first weld face which extends substantially perpendicular to an axial direction of the rotating shaft, and second and third weld faces which are arranged to extend in the axial direction. A boss engagement part is formed in an inner circumferential face of a boss through hole and engages with the stator.

4 Claims, 7 Drawing Sheets

(51) Int. Cl.
*F04D 29/26* (2006.01)
*B29C 45/26* (2006.01)
*B29C 45/27* (2006.01)

(52) U.S. Cl.
CPC ......... *F04D 29/023* (2013.01); *F04D 29/263* (2013.01); *F05D 2230/21* (2013.01)

(58) Field of Classification Search
CPC ............ B29C 45/2616; B29C 45/2708; B29L 2031/748; F05D 2230/21; F05D 2300/43
See application file for complete search history.

(56) References Cited

FOREIGN PATENT DOCUMENTS

| | | |
|---|---|---|
| CN | 105264487 A | 1/2016 |
| CN | 105391696 A | 3/2016 |
| CN | 105701372 A | 6/2016 |
| EP | 1943856 B1 | 3/2010 |
| JP | 2001 21171 A | 1/2001 |
| JP | 2004 202811 A | 7/2004 |
| JP | 2005 54722 A | 3/2005 |
| JP | 2016 35238 A | 3/2016 |

OTHER PUBLICATIONS

Chinese Search Report issued in corresponding Chinese Application No. 201680003231.5, dated Sep. 25, 2019 (10 pages).

\* cited by examiner

BLOWER

TECHNICAL FIELD

The present invention relates to a blower equipped with multiple blades, and more specifically relates to a blower securement structure for mounting a resin-made centrifugal fan on a rotating shaft of a motor.

BACKGROUND ART

For example, JP-A-2016-035238 (PTL 1) is known as a blower equipped with a resin-made centrifugal fan, and particularly as a blower for an air-conditioning system for a vehicle.

This type of blower for an air-conditioning system for a vehicle includes: a resin-made fan body; a motor; and a rotation prevention member (stator) in which a rotating shaft of the motor is inserted and which is fitted in a boss formed at the rotation center of the fan body. The rotation prevention member is made by injection molding of resin and has a shaft hole, and the rotating shaft with a round-bar shape (with circular cross section) is press-fitted in the shaft hole. Thereby, the rotation prevention member can transmit the torque of the motor to a centrifugal fan without running idle with respect to the rotating shaft.

In addition, the rotation prevention member is provided in its outer circumference with a concave part to be fitted to the boss and, once this member is press-fitted on the rotating shaft, a large-stress generation part where large stress is generated with the concave part as its point of origin and a small-stress generation part where smaller stress than that of the large-stress generation part are formed.

Further, in the rotation prevention member, a weld face (weld line) which is easily broken by stress is formed in a portion where two flows of resin meet during the process of injection molding.

Thus, PTL 1 states that a weld face is formed at the location of the small-stress generation part, which makes it possible to prevent a crack from being generated in the portion where the weld face is formed even if the rotation prevention member is press-fitted on the rotating shaft and uneven stress is generated.

CITATION LIST

Patent Literature

PTL 1: JP-A-2016-035238

SUMMARY OF INVENTION

Technical Problem

However, in the technique disclosed in PTL 1, the weld face is formed across the entire length of the rotation prevention member in the longitudinal direction thereof. For this reason, even if the weld face is formed at the small-stress generation part, it is predicted that a crack generated in a certain portion of the weld face easily expands in the longitudinal direction and eventually makes it unable to secure the rotation prevention member on the rotating shaft. In other words, this may make the rotation prevention member no longer be able to exhibit its required function, i.e., to transmit the torque of the rotating shaft to the centrifugal fan without running idle.

The present invention has been made in view of the above circumstances, and has an objective that a blower which uses a rotation prevention member in which a rotating shaft with circular cross section is press-fitted achieves a blower securement structure with superior durability by which a crack generated in a weld face of the rotation prevention member no longer expands across the entire length thereof.

Solution to Problem

A blower according to the present invention with reference signs used in examples is as follows.

Specifically, an invention described in Claim 1 is a blower 1 including: a scroll housing 2 through which air flows; a motor 70 which is secured on the scroll housing and has a rotating shaft 71 with circular cross section; a resin-made stator 20 which is press-fitted on the rotating shaft; and a resin-made centrifugal fan 60 which is housed in the scroll housing and has a boss 61 inserted on the stator, a cone 62 extending from the boss, and a plurality of blades 63 extending from an outer circumferential part of the cone, wherein the stator is a tubular member and includes: a stator first end face 21 which is close to a tip of the rotating shaft; a stator second end face 22 which is far from the tip of the rotating shaft; a stator outer circumferential face 23 which is formed between the stator first end face and the stator second end face; a stator through hole 24 in which the rotating shaft is inserted; and a concave or convex stator engagement part 25 which is formed in the stator outer circumferential face, the boss is a tubular member and includes: a boss through hole 64 in which the stator is inserted; and a boss engagement part 65 which is formed in an inner circumferential face of the boss through hole and engages with the stator engagement part, and the stator has: a first weld face W1 which is disposed between the stator first end face and the stator second end face so as to extend substantially perpendicular to an axial direction of the rotating shaft; a second weld face W2 which is disposed between the stator first end face and the first weld face so as to extend in the axial direction of the rotating shaft; and a third weld face W3 which is disposed between the stator second end face and the first weld face so as to extend in the axial direction of the rotating shaft and to be located at a different position from the second weld face in a circumferential direction.

An invention described in Claim 2 is based on the blower described in Claim 1, wherein the second weld face and the third weld face are arranged substantially opposed to each other in the circumferential direction.

An invention described in Claim 3 is based on the blower described in Claim 1, wherein the second weld face and the third weld face are arranged substantially orthogonal to each other in the circumferential direction.

An invention described in Claim 4 is based on the blower described in any one of Claims 1 to 3, wherein the stator engagement part is formed to have a convex shape on the outer circumferential face.

Advantageous Effects of Invention

According to the invention described in Claim 1, the stator has the second weld face W2 and the third weld face W3 which extend in the axial direction of the rotating shaft, but they are both located between the stator end face and the first weld face W1 (the first weld face W1 which is disposed between the stator first end face and the stator second end face so as to extend substantially perpendicular to the axial direction of the rotating shaft). In other words, although the weld faces are formed in the longitudinal direction of the stator, they do not extend across the entire length of the stator in the longitudinal direction thereof. Moreover, the second weld face W2 and the third weld face W3 are arranged at different positions in the circumferential direction of the stator. Thereby, even when a crack should be generated in any of the weld faces, it is possible to prevent the crack from expanding throughout the stator in the longitudinal direction thereof.

Further, as in the invention described in Claim 2, it is preferable that the second weld face W2 and the third weld face W3 be arranged substantially opposed to each other in the circumferential direction. Even if a crack should be generated in any of the second weld face W2 and the third weld face W3, because these faces are arranged substantially opposed to each other in the circumferential direction, it is possible to make a crack on one side less likely to affect the other weld face where no crack is generated.

Further, as in the invention described in Claim 3, it is preferable that the second weld face W2 and the third weld face W3 be arranged substantially orthogonal to each other in the circumferential direction. These faces are arranged substantially orthogonal to each other in the circumferential direction; thus, even if stress is applied in one direction (e.g. a right-left extending direction) and a crack should be generated in one weld face, because a direction in which the other weld face is cracked easily (e.g. a front-rear extending direction) differs from the one direction, it is possible to prevent the two weld faces extending in the axial direction from being cracked due to the stress in the one direction.

Further, as in the invention described in Claim 4, it is preferable that the stator engagement part be formed to have a convex shape on the outer circumferential face. While the stator engagement part formed to have a concave shape in the outer circumferential face of the stator has a large-stress generation part, it is possible to inhibit the creation of such a large-stress generation part by forming the stator engagement part to have a convex shape.

In this manner, according to the present invention, even if a crack is generated in a weld face in a blower having a structure in which a centrifugal fan is secured on a rotating shaft with circular cross section, the crack can be prevented from expanding throughout a stator in the longitudinal direction thereof, whereby a blower securement structure with superior durability can be provided.

DESCRIPTION OF EMBODIMENTS

Figure 1A:
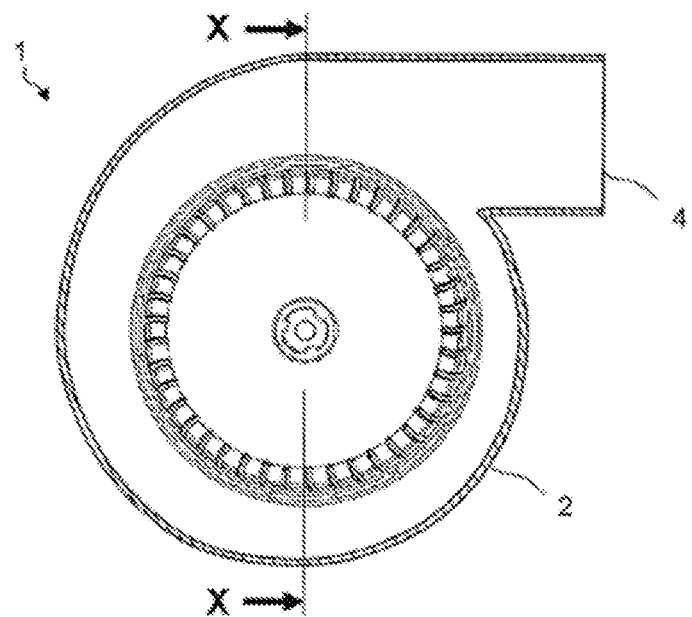
FIG. 1 illustrates a blower according to an embodiment of the present invention, in which: part (A) of FIG. 1 is a schematic sectional view illustrating its cross section perpendicular to the axis line of its rotating shaft; and part (B) of FIG. 1 is a sectional view of part (A) of FIG. 1 taken along line X-X.
Figure 1B:
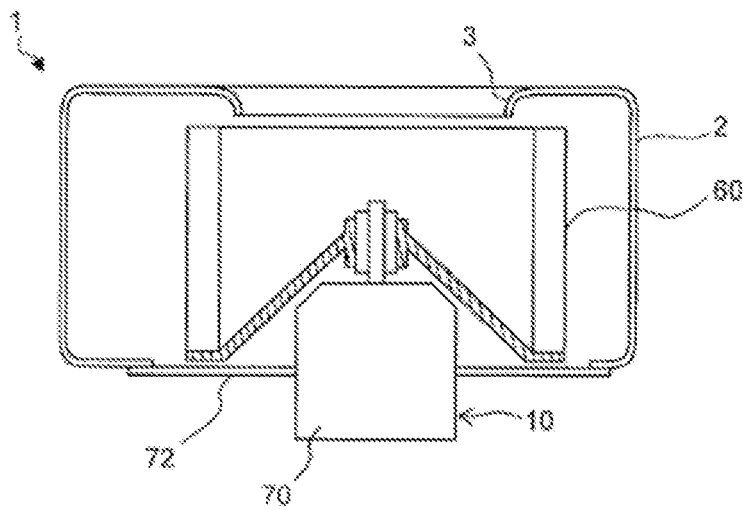
Figure 2:
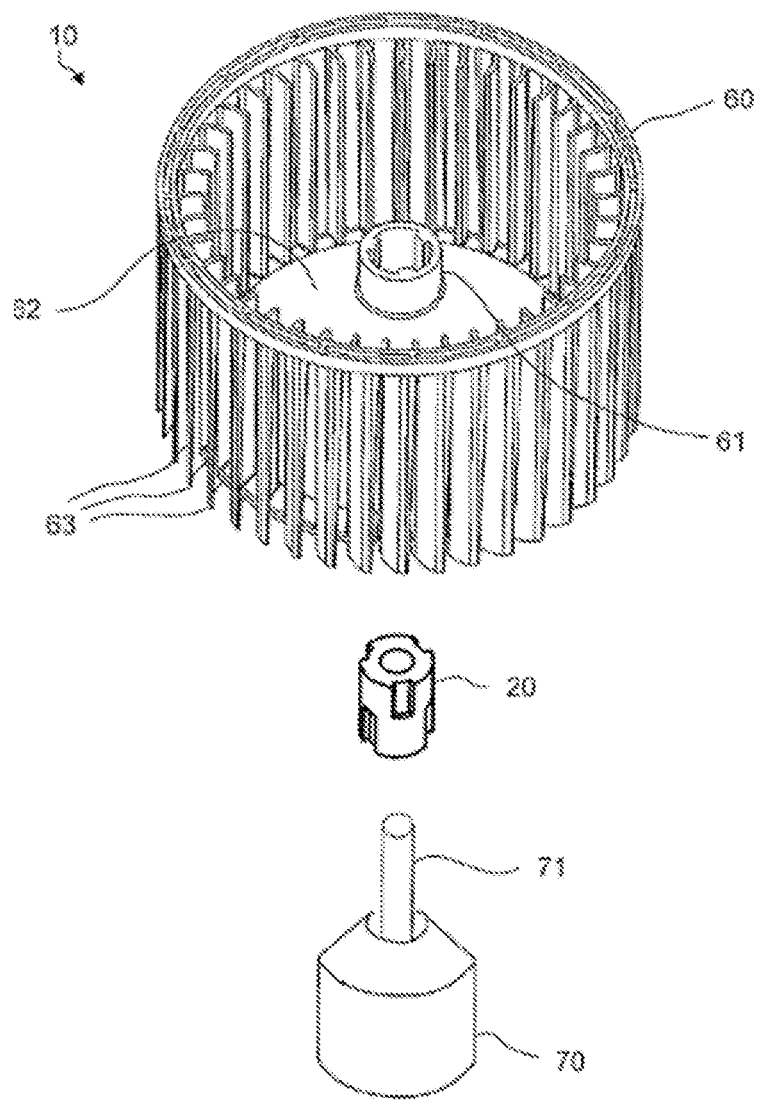
FIG. 2 is an exterior perspective view illustrating components of a fan motor.

Hereinbelow, an aspect of the present invention is described with reference to the attached drawings. Embodiments to be described below are examples of the present invention, and the present invention is not limited to the embodiments below. Note that, in this specification and drawings, constituents assigned the same reference signs are the same. In addition, forms of the embodiments may be changed in various ways as long as the operation and effect of the present invention can be achieved.

FIGS. 1 to 6 indicate constituents (structural members) of a blower according to a first embodiment of the present invention. A blower 1 according to this embodiment is constituted of: a scroll housing 2 through which air flows; an illustrated motor 70 which is secured on the scroll housing and has a rotating shaft 71 with circular cross section; a resin-made stator 20 which is press-fitted on the rotating shaft 71; and a resin-made centrifugal fan 60 which is housed in the scroll housing 2 and has a boss 61 inserted on the stator 20, a cone 62 extending from the boss 61, and multiple blades 63 extending from an outer circumferential part of the cone 62. The stator 20 and the centrifugal fan 60 are mounted on the motor 70 through the rotating shaft 71 to be assembled into a fan motor 10, and the fan motor is then mounted on the scroll housing 2. In this event, the fan motor 10 is mounted on the scroll housing 2 by securing a disk-shaped flange 72 supporting the motor 70 on the scroll housing 2 by a known method (e.g. with a screw).

In the blower 1, the torque of the rotating shaft 71 of the motor 70 is transmitted to the stator 20, the boss 61, the cone 62, and the blades 63, and thereby rotates the centrifugal fan 60. The blower can suck in the air through a bell mouth 3 installed in the scroll housing 2, and blow out the sucked air through a blowout port 4.

Like existing techniques (such as PTL 1 described above), the stator 20 is made of resin with large mechanical strength, and the boss 61 is made of resin with small mechanical strength. Alternatively, the stator 20 and the boss 61 may be made of resin with similar mechanical strength. In addition, the stator 20 and the centrifugal fan 60 are formed by a known molding method such as injection molding.

The stator 20 is a tubular member and is press-fitted on the rotating shaft 1 as described above. The centrifugal fan 60 is mounted on the stator 10 through the boss 61, and the torque of the rotating shaft 71 is transmitted to the centrifugal fan 60 by way of this stator 20. For this reason, the stator 20 is firmly fastened to the rotating shaft 71 so as not to slip on or move axially with respect to the rotating shaft 71.

Figure 4:
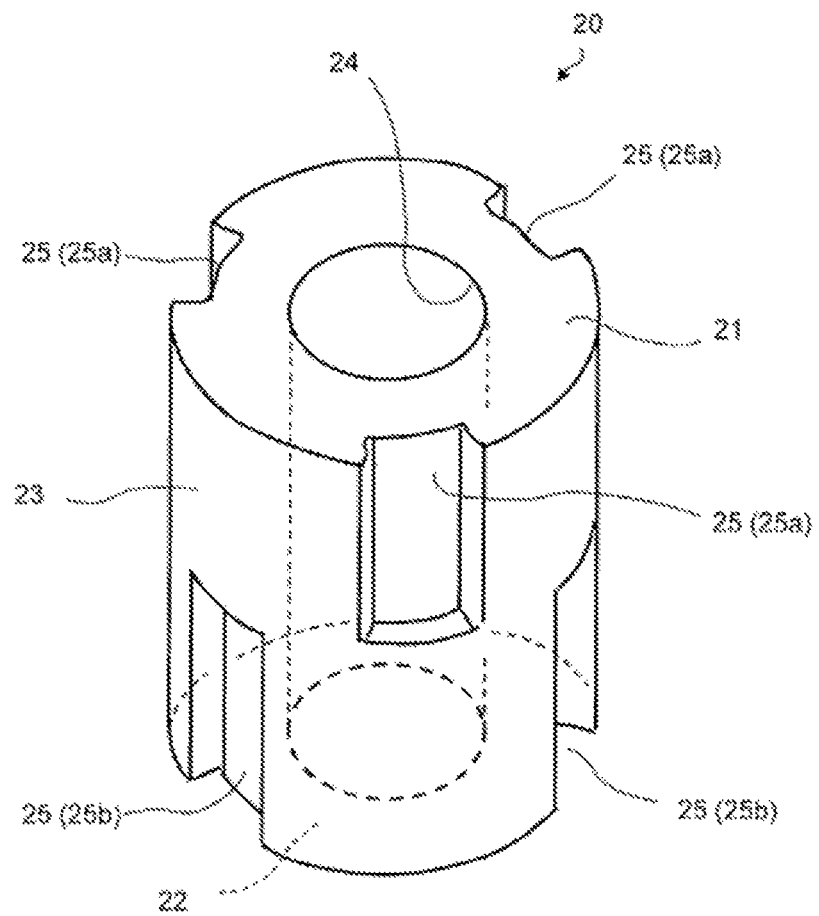
FIG. 4 is an exterior perspective view illustrating a stator according to the example of the present invention as viewed downward from the top.

As illustrated in FIG. 4, the stator 20 includes: a stator first end face 21 which is close to the tip of the rotating shaft 71; a stator second end face 22 which is far from the tip of the rotating shaft; a stator outer circumferential face 23 which is formed between the stator first end face 21 and the stator second end face 22; a stator through hole 24 in which the rotating shaft 71 is press-fitted; and a concave or convex stator engagement part 25 (stator first engagement part 25a, stator second engagement part 25b) which is formed in the stator outer circumferential face 23. In this embodiment, the stator first end face 21 is located on the upper side of the drawing whereas the stator second end face 22 is located on the lower side of the drawing.

In the stator 20 of this embodiment, the stator engagement part 25 has a concave shape. In addition, the stator first engagement part 25a and the stator second engagement part 25b are arranged equiangularly and radially about the virtual axis line of the rotating shaft 71.

The stator first engagement part 25a extends from the stator first end face 21 in the axial direction of the rotating shaft 71, its end part to which the stator first engagement part extends is stepped, and the stator outer circumferential face 23 extends over this end part (below this end part in FIG. 4). Meanwhile, the stator second engagement part 25b extends from the stator second end face 22 in the axial direction of the rotating shaft 71, its end part to which the stator second engagement part extends is stepped, and the stator outer circumferential face 23 extends over this end part (above this end part in FIG. 4).

The boss 61 is a tubular member made of resin and is inserted on the stator 20. The boss 61 of this embodiment includes: a boss through hole 64 in which the stator 20 is inserted; and a boss first engagement part 65a and a boss second engagement part 65b which are formed in the inner circumferential face of the boss through hole 64 and respectively engage with the stator first engagement part 25a and the stator second engagement part 25b.

In the boss 61 of this embodiment, the boss first engagement part 65a and the boss second engagement part 65b each have a convex shape that corresponds to the concave shape of each of the stator first engagement part 25a and the stator second engagement part 25b. In addition, the boss first engagement part 65a and the boss second engagement part 65b are arranged equiangularly and radially about the virtual axis line of the rotating shaft 71 so as to correspond to the stator first engagement part 25a and the stator second engagement part 25b.

Figure 3A:
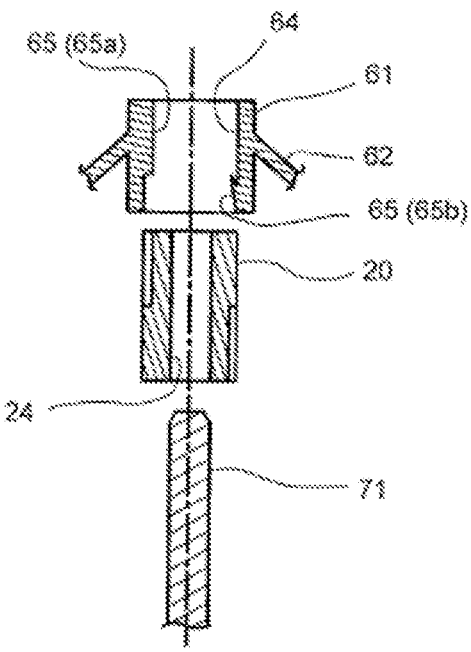
FIG. 3 illustrates a chief part for securing a centrifugal fan on the rotating shaft, in which: part (a) of FIG. 3 is a schematic sectional view illustrating a state before the centrifugal fan is secured; and part (b) of FIG. 3 is a schematic sectional view illustrating a state where the centrifugal fan is secured.
Figure 3B:
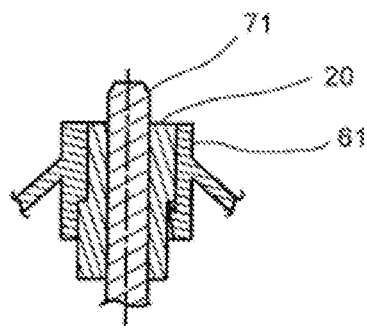

In the blower 1 of this embodiment, as illustrated in FIG. 3, the stator 20 is press-fitted on the rotating shaft 71 of the motor, and the boss 61 of the centrifugal fan 60 is inserted on this stator 20 from the tip side of the rotating shaft 71 in such a way as to make the engagement parts of the boss 61 respectively engage with the engagement parts of the stator 20. Thereby, the stator 20 as illustrated in part (b) of FIG. 3, i.e., the stator 20 in which the metallic rotating shaft 71 is press-fitted is constantly stressed in a direction in which the stator through hole 24 is expanded.

To insert the boss 61 onto the stator 20 from the stator first end face 21 side thereof, in a state where the boss first engagement part 65a and the boss second engagement part 65b of the boss 61 are aligned with the stator first engagement part 25a and the stator second engagement part 25b respectively so that they match each other in the axial direction, the boss is first moved while being in slide contact with the stator outer circumferential face 23 with the boss second engagement part 65 b having a known claw shape for example constricted. Then, the boss first engagement part 65a and the boss second engagement part 65b are fitted in and engage with the stator first engagement part 25a and the stator second engagement part 25b, respectively.

In this way, the boss first engagement part 65a engages with the stator first engagement part 25a and the boss second engagement part 65b engages with the stator second engagement part 25b with their convex and concave fitted to each other. Thereby, it is possible to secure the boss so that the centrifugal fan 60 may not run idle with respect to the rotating shaft 71.

Figure 5A:
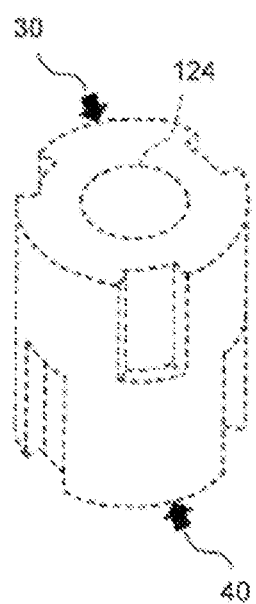
FIG. 5 relates to processes for manufacturing the stator according to the example of the present invention, in which: part (a) of FIG. 5 is a perspective view at the time when injection of resin into an injection molding mold is started; part (b) of FIG. 5 is a perspective view during the injection molding; and part (c) of FIG. 5 is a perspective view at the time when the injection molding is over.
Figure 5B:
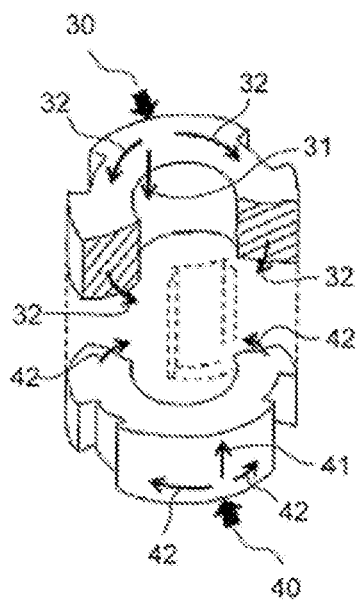
Figure 5C:
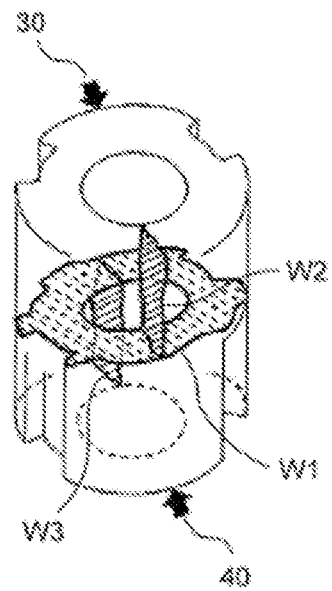

Next, using FIG. 5, a description is given of injection molding at the time of manufacturing the resin-made stator 20.

Part (a) of FIG. 5 is a perspective view at the time when injection of resin into an injection molding mold is started. Note that, part (a) of FIG. 5 illustrates the instant when injection is started, so no resin has not entered the mold yet.

Resin is injected at substantially the same time through: a first-side injection port 30 which is formed in a face (an upper face in part (a) of FIG. 5) where the stator first end face 21 is to be formed; and a second-side injection port 40 which is formed in a face (a lower face in part (a) of FIG. 5) where the stator second end face 22 is to be formed. The first-side injection port 30 and the second-side injection port 40 are located at different positions both vertically and circumferentially with respect to a stator-shaped space (a dotted part illustrated in part (a) of FIG. 5). Part (a) of FIG. 5 illustrates an example where these injection ports are arranged substantially opposed to each other with a stator-through-hole scheduled-to-be-formed part 124 interposed therebetween.

Part (b) of FIG. 5 is a perspective view of the mold during the injection molding. Resin injected through the first-side injection port 30 fills a space inside the mold while moving in directions indicated by a flow of resin 31 in the direction the rotating shaft extends and a flow of resin 32 in the circumferential direction. Resin injected through the second-side injection port 40 fills the space inside the mold while moving in directions indicated by a flow of resin 41 in the direction the rotating shaft extends and a flow of resin 42 in the circumferential direction.

Part (c) of FIG. 5 is a perspective view at the time when the injection molding is over. The resin injected through the first-side injection port 30 spreads downward in the space of the mold along the flow of resin 31 in the direction the rotating shaft extends whereas the resin injected through the second-side injection port 40 spreads upward in the space of the mold along the flow of resin 41 in the direction the rotating shaft extends, and they forma weld face W1 at a location where they meet. As illustrated in part (c) of FIG. 5, the first weld face W1 is located between the stator first end face 21 and the stator second end face 22, and is a face disposed substantially perpendicular to the axial direction of the rotating shaft 71.

Here, a weld face (also referred to as a weld line) is a face that is formed in a region where flows of resin meet, and is characterized in that the binding strength of resin molecules is weaker and yield strength against stress is smaller in this region than those in a region where a flow of resin is crystallized normally.

Meanwhile, the resin injected through the first-side injection port 30 spreads in the circumferential direction in the space of the mold along the flow of resin 32 in the circumferential direction and forms a second weld face W2. As a result, the resin injected through the first-side injection port 30 fills a space between the stator first end face 21 and the first weld face W1 and forms the second weld face W2 in a region substantially opposed to the first-side injection port 30 in the circumferential direction.

Meanwhile, the resin injected through the second-side injection port 40 spreads in the circumferential direction in the space of the mold along the flow of resin 42 in the circumferential direction and forms a third weld face W3. As a result, the resin injected through the second-side injection port 40 fills a space between the stator second end face 22 and the first weld face W1 and forms the third weld face W3 in a region substantially opposed to the second-side injection port 40 in the circumferential direction.

In other words, it is possible to manufacture the stator 20 so that the second weld face W2 may not reach the stator second end face 22 and the third weld face W3 may not reach the stator first end face 21.

Figure 6:
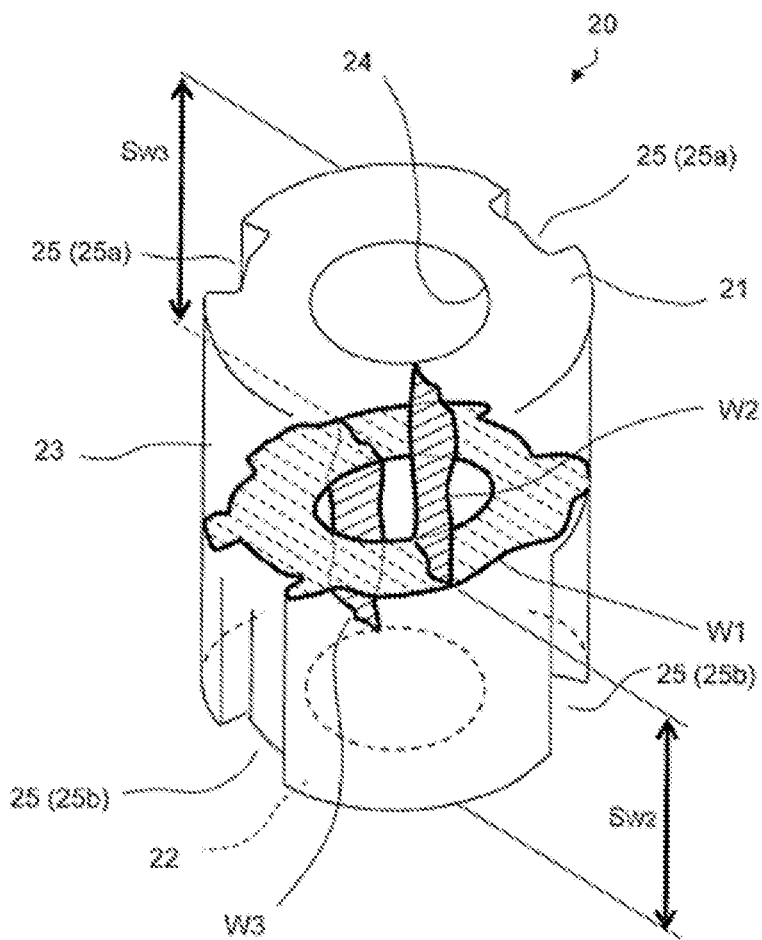
FIG. 6 is an exterior perspective view in which weld surfaces are added to the stator in FIG. 4.

Next, using FIG. 6, a description is given of the relationship between stress to be applied on the stator 20 and the three weld faces W1, W2, W3.

In the stator 20, as described above, the rotating shaft 71 is press-fitted in the stator through hole 24, and stress is applied thereon in the direction in which the stator through hole 24 is expanded.

The stress in the direction in which the stator through hole 24 is expanded is applied on the first weld face W1 in a direction in which this face extends. In other words, the stress is applied in a direction different from such a direction as to separate the stator toward the stator first end face 21 and toward the stator second end face 22 about the first weld face W1. Accordingly, no crack is generated even when the rotating shaft 71 is press-fitted in the stator through hole 24.

The stress in the direction in which the stator through hole 24 is expanded is applied on the second weld face W2 in a direction substantially perpendicular to a direction in which this face extends. In other words, the stress is applied in such a direction as to separate the stator in the circumferential direction about the second weld face W2. Accordingly, a crack may be generated if the rotating shaft 71 is press-fitted in the stator through hole 24.

However, even if a crack should be generated in the second weld face W2, a spacing SW2 exists between the second weld face W2 and the stator second end face 22, and resin that is poured through the second-side injection port 40 and appropriately crystallized exists in this spacing. This prevents the stator 20 from being cracked totally in the axial direction of the rotating shaft 40.

The stress in the direction in which the stator through hole 24 is expanded is applied on the third weld face W3 in a direction substantially perpendicular to a direction in which this face extends. In other words, the stress is applied in such a direction as to separate the stator in the circumferential direction about the third weld face W3. Accordingly, a crack may be generated if the rotating shaft 71 is press-fitted in the stator through hole 24.

However, even if a crack should be generated in the third weld face W3, a spacing SW3 exists between the third weld face W3 and the stator first end face 21, and resin that is poured through the first-side injection port 30 and appropriately crystallized exists in this spacing. This prevents the stator 20 from being cracked totally in the axial direction of the rotating shaft 40.

In addition, even if a crack should be generated in any of the second weld face W2 and the third weld face W3, because these faces are arranged substantially opposed to each other in the circumferential direction, it is possible to effectively prevent a crack on one side from affecting the other weld face where no crack is generated.

In this manner, even if a crack is generated in the weld face, the crack can be prevented from expanding throughout the stator in the longitudinal direction thereof, whereby a blower securement structure with superior durability can be provided.

Next, a second embodiment of the present invention is described.

Figure 7:
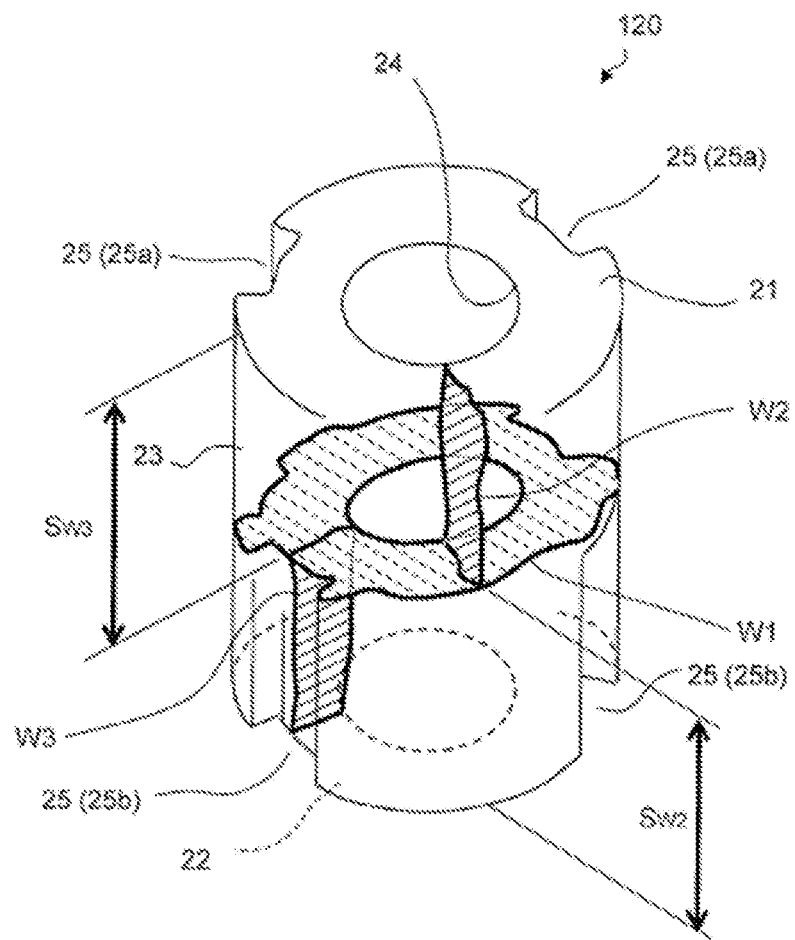
FIG. 7 is an exterior perspective view illustrating a stator according to another example of the present invention as viewed downward from the top.

FIG. 7 illustrates a stator 120 in which three weld faces W1, W2, W3 are arranged. This stator differs from the stator 20 of FIG. 6 in the location of the third weld face W3 in the circumferential direction which is located substantially orthogonal to the second weld face W2.

In the stator 20, as described above, the rotating shaft 71 is press-fitted in the stator through hole 24, and stress is applied thereon in the direction in which the stator through hole 24 is expanded.

When the rotating shaft 71 is press-fitted in the stator through hole 24, no crack is generated even if the stress in the direction in which the stator through hole 24 is expanded is applied on the first weld face W1; however, a crack may be generated if this stress is applied on the second weld face W2 and on the third weld face W2.

However, because the spacing SW2 exists between the second weld face W2 and the stator second end face 22, and the spacing SW3 exists between the third weld face W1 and the stator first end face 21, it is possible to prevent the stator 20 from being cracked totally in the axial direction of the rotating shaft 40.

Here, even if a crack should be generated in any of the second weld face W2 and the third weld face W3, they are arranged substantially orthogonal to each other. For this reason, even if stress is applied in one direction (e.g. a right-left extending direction) in a biased fashion (i.e. a biased stress F is applied) and a crack should be generated in one weld face, because a direction in which the other weld face is cracked easily (e.g. a front-rear extending direction) differs from the one direction, it is possible to prevent the two weld faces extending in the axial direction from being cracked due to the stress in the one direction (biased stress F).

Hereinabove, the blower employing the present invention has been described by showing the first and second embodiments; however, it is obvious that the present invention is not limited to these embodiments. For example, the stator engagement part 25 may be formed to have a convex shape on the outer circumferential face. While the stator engagement part formed to have a concave shape in the outer circumferential face of the stator has a large-stress generation part, it is possible to inhibit the creation of such a large-stress generation part by forming the stator engagement part to have a convex shape. In addition, as to the difference in the locations of the second weld face W2 and the third weld face W3 in the circumferential direction, their locations may be not only set substantially opposed to each other or substantially orthogonal to each other but also set as appropriate in consideration of the shape of the stator, a direction in which stress is to be applied on the stator, etc., as long as it is possible to prevent both the second weld face W2 and the third weld face W3 from being cracked due to stress applied in one direction.

INDUSTRIAL APPLICABILITY

The blower according to the present invention can be manufactured industrially and can be used particularly preferably for an air-conditioning system for a vehicle.

REFERENCE SIGNS LIST

1: blower
2: scroll housing
3: bell mouth

4: blowout port
10: fan motor
20, 120: stator
21: stator first end face
22: stator second end face
23: stator outer circumferential face
24: stator through hole
25: stator engagement part 25
25a: stator first engagement part
25b: stator second engagement part
30: first-side injection port
31: flow of resin in direction rotating shaft extends
32: flow of resin in circumferential direction
40: second-side injection port
41: flow of resin in direction rotating shaft extends
42: flow of resin in circumferential direction
60: centrifugal fan
61: boss
62: cone
63: blade
64: boss through hole
65: boss engagement part
65a: boss first engagement part
65b: boss second engagement part
70: motor
71: rotating shaft
72: flange
124: stator-through-hole scheduled-to-be-formed part
SW2: spacing
SW3: spacing
W1: first weld face
W2: second weld face
W3: third weld face.

The invention claimed is:

1. A blower comprising:
a scroll housing through which air flows;
a motor which is secured on the scroll housing and has a rotating shaft 71 with circular cross section;
a resin-made stator which is press-fitted on the rotating shaft; and
a resin-made centrifugal fan which is housed in the scroll housing and has a boss 61 inserted on the stator, a cone extending from the boss, and a plurality of blades extending from an outer circumferential part of the cone,
wherein the stator is a tubular member and includes:
a stator first end face which is close to a tip of the rotating shaft,
a stator second end face which is far from the tip of the rotating shaft,
a stator outer circumferential face which is formed between the stator first end face and the stator second end face,
a stator through hole in which the rotating shaft is inserted, and
a concave or convex stator engagement part which is formed in the stator outer circumferential face,
wherein the boss is a tubular member and includes:
a boss through hole in which the stator is inserted, and
a boss engagement part which is formed in an inner circumferential face of the boss through hole and engages with the stator engagement part, and
wherein the stator has:
a first weld face which is disposed between the stator first end face and the stator second end face so as to extend substantially perpendicular to an axial direction of the rotating shaft,
a second weld face which is disposed between the stator first end face and the first weld face so as to extend in the axial direction of the rotating shaft, and
a third weld face which is disposed between the stator second end face and the first weld face so as to extend in the axial direction of the rotating shaft and to be located at a different position from the second weld face in a circumferential direction.

2. The blower according to claim 1, wherein the second weld face and the third weld face are arranged substantially opposed to each other in the circumferential direction.

3. The blower according to claim 1, wherein the second weld face and the third weld face are arranged substantially orthogonal to each other in the circumferential direction.

4. The blower according to claim 1, wherein the stator engagement part is formed to have a convex shape on the outer circumferential face.

* * * * *